(12) United States Patent
Ratnakaram et al.

(10) Patent No.: US 11,549,555 B1
(45) Date of Patent: Jan. 10, 2023

(54) TURBOMACHINE WITH ROLLER ELEMENT BEARING ARRANGEMENT

(71) Applicant: Garrett Transportation I Inc., Torrance, CA (US)

(72) Inventors: Mahidhar Raju Ratnakaram, Madanapalle (IN); Joel Pierre Raymond Castan, Epinal (FR); Christopher Clive Keith Mitchell, Normandy (FR); Kiran Somashekar Rao Nazare, Bangalore (IN); Jean-Luc Perrin, Capavenir Vosges (FR); Gérard Dieudonné, Les Forges (FR)

(73) Assignee: GARRETT TRANSPORTATION I INC., Torrance, CA (US)

( * ) Notice: Subject to any disclaimer, the term of this patent is extended or adjusted under 35 U.S.C. 154(b) by 0 days.

(21) Appl. No.: 17/304,963

(22) Filed: Jun. 29, 2021

(51) Int. Cl.
 *F16C 35/07* (2006.01)
 *F02C 6/12* (2006.01)
 *F02B 37/04* (2006.01)
 *F02B 39/10* (2006.01)

(52) U.S. Cl.
 CPC .............. *F16C 35/07* (2013.01); *F02B 37/04* (2013.01); *F02C 6/12* (2013.01); *F02B 39/10* (2013.01); *F05D 2240/50* (2013.01); *F16C 2360/00* (2013.01)

(58) Field of Classification Search
 CPC ...... F16C 35/07; F16C 2360/00; F02B 37/04; F02B 39/10; F02C 6/12; F05D 2240/50
 See application file for complete search history.

(56) References Cited

U.S. PATENT DOCUMENTS

| 7,371,011 | B2 | 5/2008 | McKeirnan, Jr. | |
| 2010/0104233 | A1* | 4/2010 | Bando | F02B 39/00 |
| | | | | 384/490 |
| 2012/0039555 | A1 | 2/2012 | Tabata | |
| 2014/0270614 | A1 | 9/2014 | McKeirnan, Jr. | |
| 2018/0106263 | A1* | 4/2018 | Taylor | F04D 29/053 |

FOREIGN PATENT DOCUMENTS

EP 3061942 A1 8/2016

\* cited by examiner

*Primary Examiner* — Loren C Edwards
*Assistant Examiner* — Edward Bushard
(74) *Attorney, Agent, or Firm* — Lorenz & Kopf, LLP

(57) ABSTRACT

A bearing arrangement for a turbomachine includes first and second roller element bearings. The first bearing and the second bearing are disposed on opposite axial ends of an intermediate sleeve of the rotating group. The first bearing has a first inner race with a first inner radial surface and a first outer radial surface. The first inner radial surface has a first interference fit with a shaft of the rotating group. The first outer radial surface has a second interference fit with the intermediate sleeve. The second bearing has a second inner race with a second inner radial surface and a second outer radial surface. The second inner race receives the shaft with a clearance fit. The second outer radial surface has a third interference fit with the intermediate sleeve. The second inner race is coaxially aligned with the first inner race and the shaft via coaxial alignment of the intermediate sleeve and the first inner race.

20 Claims, 4 Drawing Sheets

TURBOMACHINE WITH ROLLER ELEMENT BEARING ARRANGEMENT

TECHNICAL FIELD

The present disclosure generally relates to a turbomachine and, more particularly, relates to a turbomachine with a roller element bearing arrangement.

BACKGROUND

Various bearing systems are provided for supporting rotation of a shaft within a housing. For example, turbomachines (e.g., turbochargers, superchargers, motorized turbomachines, turbogenerators, etc.) may include one or more roller element bearings. These bearings preferably support efficient rotation of the shaft, across a wide range of operating conditions, and throughout a long operating lifetime.

It is difficult, however, to make and assemble turbomachines with precision and accuracy. For example, it may be inefficient and costly to make parts of the turbomachine to high tolerances. Furthermore, it may be inefficient and costly to assemble a rotating group with these parts and to support it on roller element bearings for rotation within the housing.

Thus, it is desirable to provide a turbomachine with a rotating group supported on roller element bearings that can be made and/or assembled with roller element bearings using a manufacturing system and method that provides high efficiency and reduces costs. Other desirable features and characteristics of the present disclosure will become apparent from the subsequent detailed description and the appended claims, taken in conjunction with the accompanying drawings and this background discussion.

BRIEF SUMMARY

In one embodiment, a turbomachine is disclosed that includes a housing and a rotating group including a shaft and an intermediate sleeve that receives the shaft. The turbomachine also includes a bearing arrangement with a first bearing and a second bearing that include roller elements and that support the rotating group for rotation about an axis of rotation relative to the housing. The first bearing and the second bearing are disposed on opposite axial ends of the intermediate sleeve. The first bearing has a first inner race with a first inner radial surface and a first outer radial surface. The first inner radial surface has a first interference fit with the shaft. The first outer radial surface has a second interference fit with the intermediate sleeve. The second bearing has a second inner race with a second inner radial surface and a second outer radial surface. The second inner race receives the shaft with a clearance fit. The second outer radial surface has a third interference fit with the intermediate sleeve. The second inner race is coaxially aligned with the first inner race and the sleeve via coaxial alignment of the intermediate sleeve and the first inner race.

In another embodiment, a method of manufacturing a turbomachine is disclosed, wherein the turbocharger has a housing, a rotating group, and a roller element bearing arrangement that supports the rotating group for rotation about an axis of rotation relative to the housing. The method includes providing a first inner race of a first bearing and a second inner race of a second bearing of the bearing arrangement. The first inner race has a first inner radial surface and a first outer radial surface. The second inner race has a second inner radial surface and a second outer radial surface. The method also includes attaching, with a first interference fit, a shaft of the rotating group to the first inner radial surface of the first inner race. The method further includes attaching, with a second interference fit, the first outer radial surface to an intermediate sleeve of the rotating group. Moreover, the method includes inserting the shaft into the second inner race with a clearance fit. Furthermore, the method includes attaching, with a third interference fit, the second outer radial surface to the intermediate sleeve to coaxially align the second inner race with the first inner race and the shaft via coaxial alignment of the intermediate sleeve and the first inner race.

In an additional embodiment, an e-assist turbocharger is disclosed. The turbocharger includes a housing and a rotating group having a shaft, a first wheel member fixed to the shaft, a second wheel member, and an intermediate sleeve that supports a rotor member of an electric motor. The intermediate sleeve is disposed between the first wheel and the second wheel along an axial direction defined by an axis of rotation of the rotating group. Also, the turbocharger includes a bearing arrangement with a first bearing and a second bearing that include roller elements and that support the rotating group for rotation about the axis of rotation relative to the housing. The first bearing is disposed in the axial direction between the first wheel member and the intermediate sleeve. The first bearing has a first inner race with a first inner radial surface and a first outer radial surface. The first inner radial surface has a first radial interference fit with the shaft. The first outer radial surface has a second radial interference fit with the intermediate sleeve. The second bearing is disposed in the axial direction between the intermediate sleeve and the second wheel member. The second bearing has a second inner race that is fixed to the intermediate sleeve. A first radial clearance fit is defined between the shaft and the intermediate sleeve. A second radial clearance fit is defined between the shaft and the second inner race, and a third radial clearance fit is defined between the shaft and the second wheel member.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
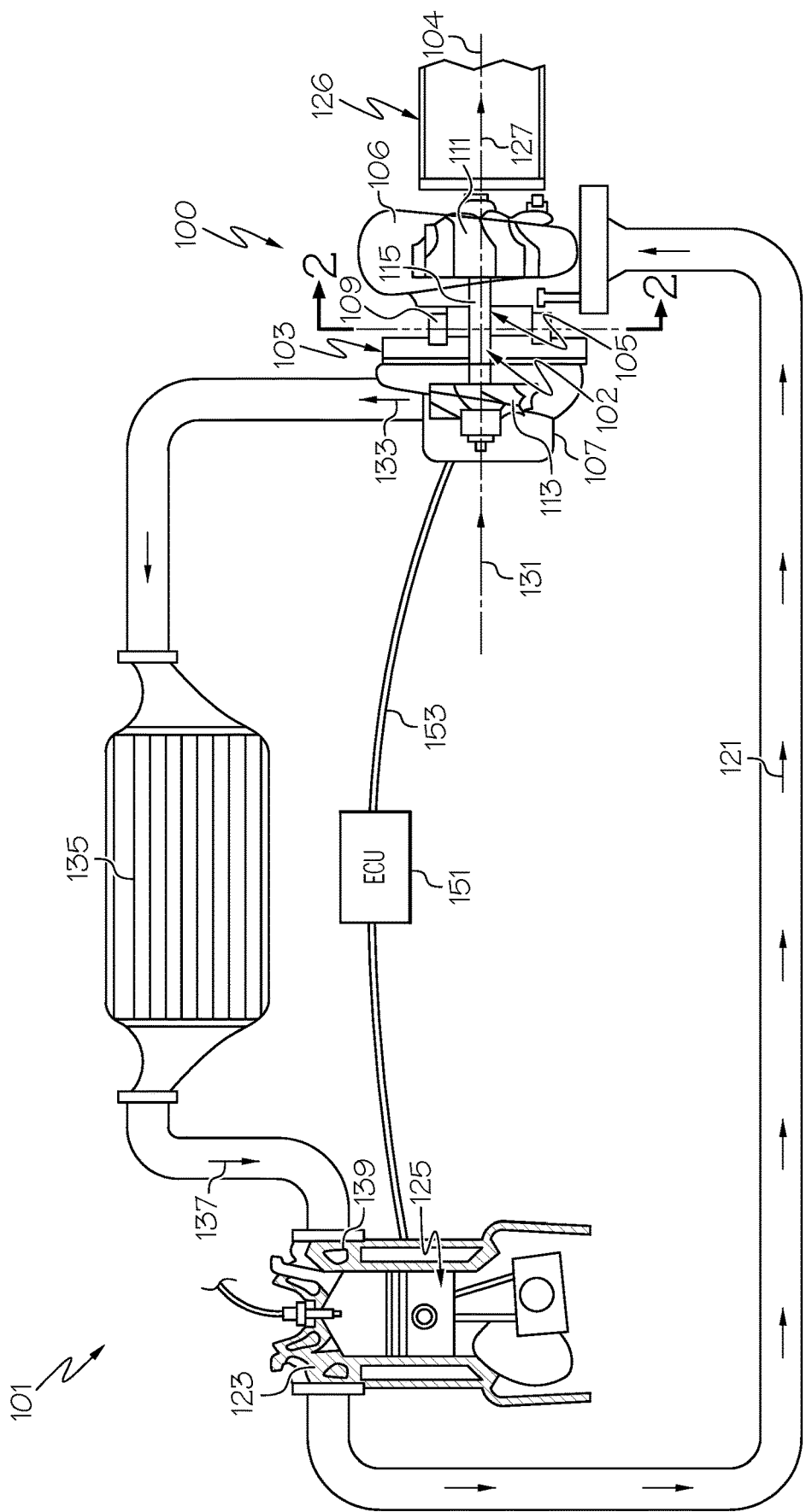
FIG. 1 is a schematic illustration of an engine system with a turbocharger that includes a bearing arrangement according to example embodiments of the present disclosure.
Figure 2:
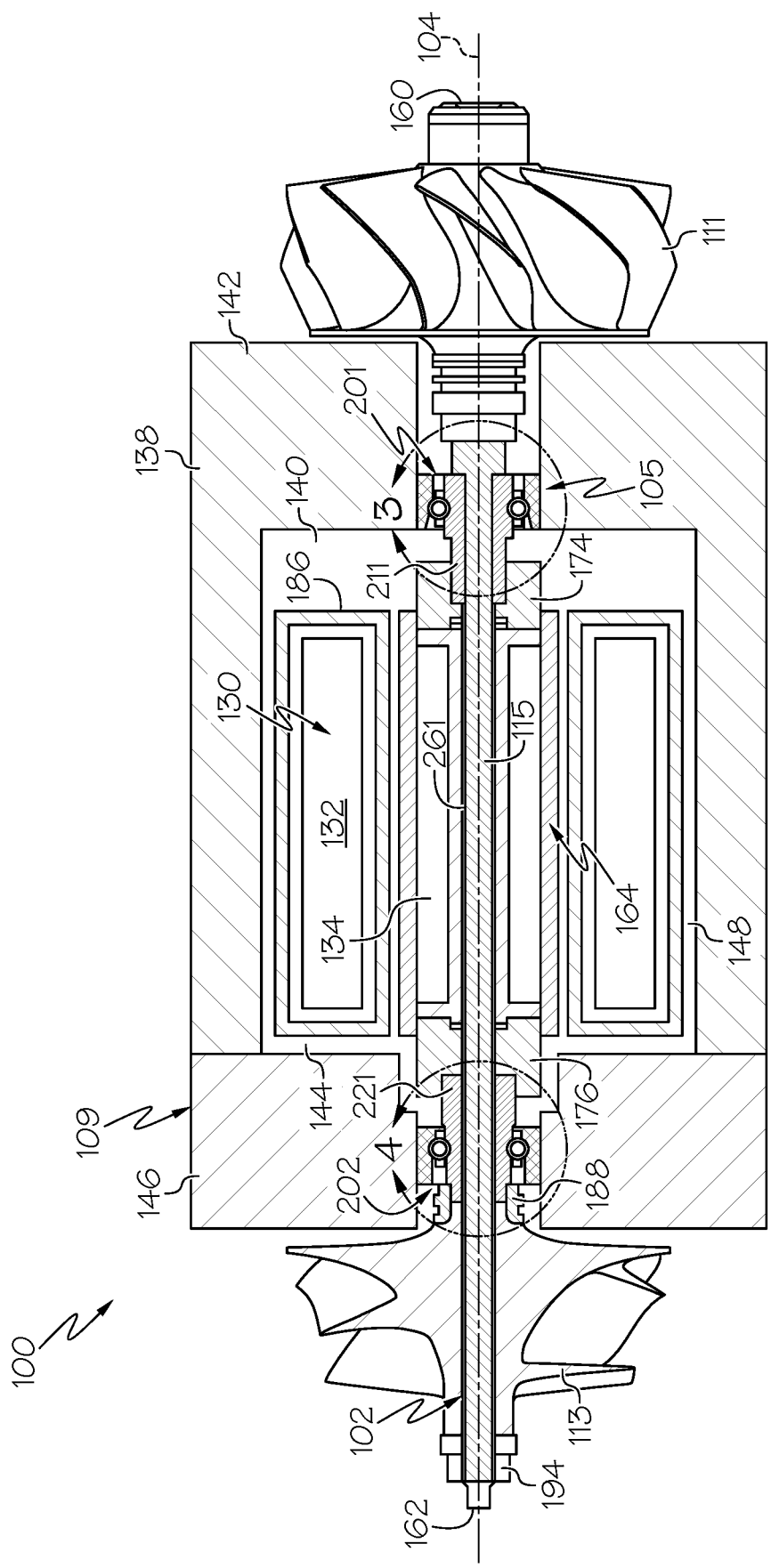
FIG. 2 is a longitudinal cross-sectional view of the rotating group and bearing system of the turbocharger of FIG. 1 according to example embodiments of the present disclosure.

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved bearing arrangement for a turbomachine. Embodiments also include improved methods of manufacturing turbomachines with the improved bearing arrangement. The embodiments of the bearing arrangement, the turbomachine, and the manufacturing method of the present disclosure may increase manufacturing precision, manufacturing efficiency, and more.

In some embodiments, the bearing arrangement may include a first bearing and a second bearing, which may be roller element bearings. This bearing arrangement may be provided in a compressor device, such as an e-motor assisted turbocharger. Thus, there may be a first wheel member (e.g., a turbine wheel) as well as a second wheel member (e.g., a compressor wheel) amongst the rotating group. Furthermore, an e-machine, such as an electric motor, may be disposed between the first and second wheel members, and the e-machine may include an intermediate sleeve, which supports a rotor member of the e-machine. The first bearing may be disposed axially between the sleeve and the first wheel member whereas the second bearing may be disposed axially between the sleeve and the second wheel member. As discussed below, other embodiments of the present disclosure may include at least some of these components, and they may be configured and arranged differently without departing from the scope of the present disclosure.

In example embodiments of the present disclosure, an inner radial surface of an inner race of the first bearing may be interference fit to the shaft at a first interference fit. An outer radial surface of the inner race may be interference fit to the intermediate sleeve. A second inner race of the second bearing may be interference fit to the intermediate sleeve. Furthermore, the second inner race and the intermediate sleeve may be loose fit (e.g., clearance fit) on the shaft. These features may be secured to the shaft on one end by the fixed attachment of the inner race of the first bearing and on the other end of the shaft by a fastener.

This arrangement provides a number of advantages. For example, respective pairs of interference-fit surfaces can be manufactured to high tolerances and precision. However, other portions of these components may be manufactured to looser tolerances to thereby save on manufacturing time, cost, etc. Also, precision-formed surface(s) of one bearing may act as a control surface for the other bearing to thereby coaxially align the bearings of the bearing system on the axis of rotation. This arrangement increases manufacturing efficiency and precision assembly to high tolerancing can be achieved. These efficiencies may also aid in high-volume, repeatable manufacturing and assembly of the turbomachine of the present disclosure.

FIG. 1 is a schematic view of an example turbomachine, such as a turbocharger 100 that is incorporated within an engine system 101. The turbocharger 100 may include one or more features of the present disclosure. It will be appreciated that the turbocharger 100 could be another turbomachine, such as a supercharger, a compressor device, an electric-motor-driven turbomachine, etc. in additional embodiments of the present disclosure. Furthermore, the turbomachine of the present disclosure may be incorporated into a number of systems other than an engine system without departing from the scope of the present disclosure.

The turbocharger 100 may include a housing 103 and a rotating group 102, which is supported within the housing 103 for rotation about an axis 104 (i.e., an axis of rotation) by a bearing system 105. The bearing system 105 may include and/or define at least one roller element bearing as will be discussed. It will be appreciated that the bearing system 105 may be included in another turbomachine (e.g., an electrically motorized e-compressor, a generator, a compressor device for a fuel-cell system, etc.) without departing from the scope of the present disclosure.

As shown in the illustrated embodiment, the housing 103 may include a turbine housing 106, a compressor housing 107, and an intermediate housing 109. The intermediate housing 109 may be disposed axially (along the axis 104) between the turbine and compressor housings 106, 107.

Additionally, the rotating group 102 may include a turbine wheel 111 (a first wheel member), a compressor wheel 113 (a second wheel member), a shaft 115, as well as other features discussed in detail below. The turbine wheel 111 is located substantially within the turbine housing 106. The compressor wheel 113 is located substantially within the compressor housing 107. The shaft 115 extends along the axis of rotation 104, through the intermediate housing 109 to connect the turbine wheel 111 to the compressor wheel 113. Accordingly, the turbine wheel 111 and the compressor wheel 113 rotate together as a unit about the axis 104.

The turbine housing 106 and the turbine wheel 111 cooperate to form a turbine (i.e., turbine section, turbine stage) configured to circumferentially receive a high-pressure and high-temperature exhaust gas stream 121 from an engine, e.g., from an exhaust manifold 123 of an internal combustion engine 125. The turbine wheel 111 and, thus, the other components of the rotating group 102 are driven in rotation around the axis 104 by the high-pressure and high-temperature exhaust gas stream 121, which becomes a lower-pressure and lower-temperature exhaust gas stream 127 that is released into a downstream exhaust pipe 126.

The compressor housing 107 and compressor wheel 113 form a compressor (i.e., compressor section, compressor stage). The compressor wheel 113, being driven in rotation by the exhaust-gas driven turbine wheel 111, is configured to compress received input air 131 (e.g., ambient air, or already-pressurized air from a previous-stage in a multi-stage compressor) into a pressurized airstream 133 that is ejected circumferentially from the compressor housing 107. The compressor housing 107 may have a shape (e.g., a volute shape or otherwise) configured to direct and pressurize the air blown from the compressor wheel 113. Due to the compression process, the pressurized air stream is characterized by an increased temperature, over that of the input air 131.

The pressurized airstream 133 may be channeled through an air cooler 135 (i.e., intercooler), such as a convectively cooled charge air cooler. The air cooler 135 may be configured to dissipate heat from the pressurized airstream 133, increasing its density. The resulting cooled and pressurized output air stream 137 is channeled into an intake manifold 139 of the internal combustion engine 125, or alternatively, into a subsequent-stage, in-series compressor. The operation of the system may be controlled by an ECU 151 (engine control unit) that connects to the remainder of the system via communication connections 153.

Referring now to FIGS. 2-5, the turbocharger 100 will be discussed in greater detail according to example embodiments. The rotating group 102 is shown and portions of the housing 103 have been omitted for clarity. Specifically, the compressor housing 107 and the turbine housing 106 have been hidden. In some embodiments, these components may be parts that are independent of the intermediate housing 109. Also, the intermediate housing 109 is illustrated schematically according to example embodiments.

In some embodiments, the turbocharger 100 may include an e-machine that is operably coupled to the rotating group 102. The e-machine may be a motor, a generator, or a combination of both. Thus, the e-machine may be configured to convert energy between rotation of the rotating group and electrical energy. In the embodiments discussed, below, the e-machine may be an electric motor 130 and thus convert electric energy to drive rotation of the rotating group 102. In additional embodiments, the e-machine may be a generator and generate electric energy from the rotation of the rotating group 102. A control system may switch functionality of a combination e-machine between motor and generator modes in some embodiments as well.

The motor 130 may have a stator member 132 and a rotor member 134. The stator member 132 may be supported by the intermediate housing 109, and the rotor member 134 may be supported by and/or may be a member of the rotating group 102 as will be discussed. The electric motor 130 may drivingly rotate the rotating group 102 for rotation about the axis 104. In some embodiments, the e-machine may be an electric generator that generates electricity from rotation of the rotating group 102. In further embodiments, the e-machine may operate as a motor in some operating conditions of the turbocharger 100, and the e-machine may operate as a generator in other operating conditions.

In some embodiments, the intermediate housing 109 may include a motor case 186. The motor case 186 may include a plurality of thin walls or shell members that cooperatively encase the stator member 132 of the motor 130. Furthermore, the intermediate housing 109 may include a sleeve 138. The sleeve 138 may define a cylindrical internal motor cavity 140, which receives the motor case 186. The sleeve 138 may also include a closed axial end 142 and an open axial end 144. The intermediate housing 109 may also include a cap 146, which may be fixedly attached to the sleeve 138 to cover over the axial end 144 and to enclose the motor case 186 within the motor cavity 140. In some embodiments, the motor case 186 may be supported within the motor cavity 140 such that there is at least one gap 148 (e.g., a radial gap) between the motor case 186 and the surrounding portions of the intermediate housing 109. The gap 148 may, in some embodiments, receive a fluid coolant that flows through a cooling system to cool the motor 130.

The rotating group 102 will now be discussed in detail according to example embodiments. The shaft 115 may be elongate with a relatively small diameter for a majority of its length. The shaft 115 may extend between a first end 160 and a second end 162. The turbine wheel 111 (i.e., first wheel member) may be fixed to the shaft 115 at the first end 160. Also, the rotating group 102 may include a seat surface 116, which is disposed proximate the turbine wheel 111. The seat surface 116 may be disposed proximate a shoulder 118 of the shaft 115. The shoulder 118 may have a larger diameter than the seat surface 116 and may be disposed axially between the seat surface 116 and the turbine wheel 111. The seat surface 116 may have a localized axial length, which is significantly less than the overall length of the shaft 115. The seat surface 116 may be configured for attaching, supporting, and seating the first bearing 201. Thus, the length of the seat surface 116 may be approximately equal to the length of the first bearing 201 in some embodiments. The outer diameter may be made to high precision and high tolerances so that the first bearing 201 provides high performance. As such, manufacturing resources may be spent forming the seat surface 116 to these high tolerance; however, the present disclosure may provide savings because the seat surface 116 is localized to a relatively short length relative to the overall length of the shaft 115.

Figure 5:
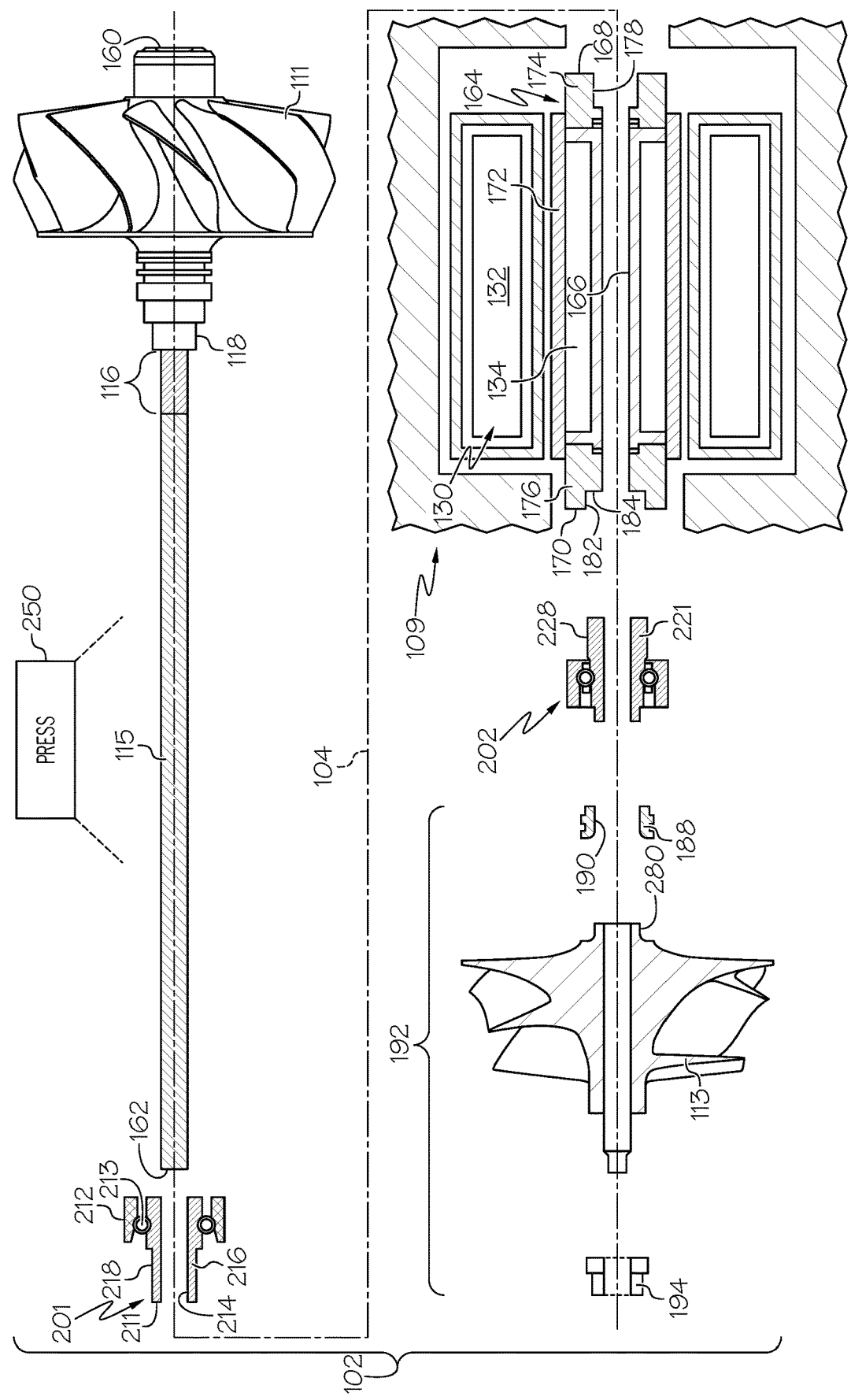
FIG. 5 is an exploded cross sectional view of the rotating group of FIG. 2, which illustrates a method of manufacturing the rotating group according to example embodiments of the present disclosure.

The rotating group 102 may further include an intermediate sleeve 164, which is shown in isolation in FIG. 5 according to some embodiments. The intermediate sleeve 164 may be substantially cylindrical and elongate so as to extend between a first end 168 and a second end 170. The intermediate sleeve 164 may also include a central bore opening 166 extending axially therethrough and substantially centered on the axis 104. The central bore opening 166 may be slightly larger in diameter than that of the shaft 115. The intermediate sleeve 164 may, in some embodiments, include a plurality of parts that are assembled together to cooperatively define the intermediate sleeve 164. For example, the intermediate sleeve 164 may include an outer cylindrical sleeve 172, a first spacer end 174 (i.e., first stub end), and a second spacer end 176 (i.e., second stub end). The cylindrical sleeve 172 may be hollow and cylindrical and may receive the rotor member 134 (e.g., a plurality of permanent magnets) therein. The first spacer end 174 may be annular, and the first spacer end 174 may be fixed and received in the sleeve 172 at the first end 168. Likewise, the second spacer end 176 may be annular, and the second spacer end 176 may be fixed and received in the sleeve 172 at the second end 170. As shown in FIG. 5, the first spacer end 174 may include an inner diameter surface 178 having a substantially constant diameter along the majority of its axial length, from a radially-inward extending step 180 to the first end 168. Similarly, the second spacer end 176 may include an inner diameter surface 182 having a substantially constant diameter along the majority of its axial length, from a radially-inward extending step 184 to the second end 170.

The rotating group 102 may further include a compressor wheel member 192 (i.e., second wheel member). In some embodiments, the compressor wheel member 192 may include the compressor wheel 113 described above. The compressor wheel member 192 may also include a spacer ring 188. The spacer ring 188 may be annular with a central opening 190.

In addition, the rotating group 102 may include a fastener 194 (e.g., a threaded fastener). The fastener 194 may be a nut in some embodiments that is configured to fasten to the second end 162 of the shaft 115 as will be discussed in detail below.

Figure 3:
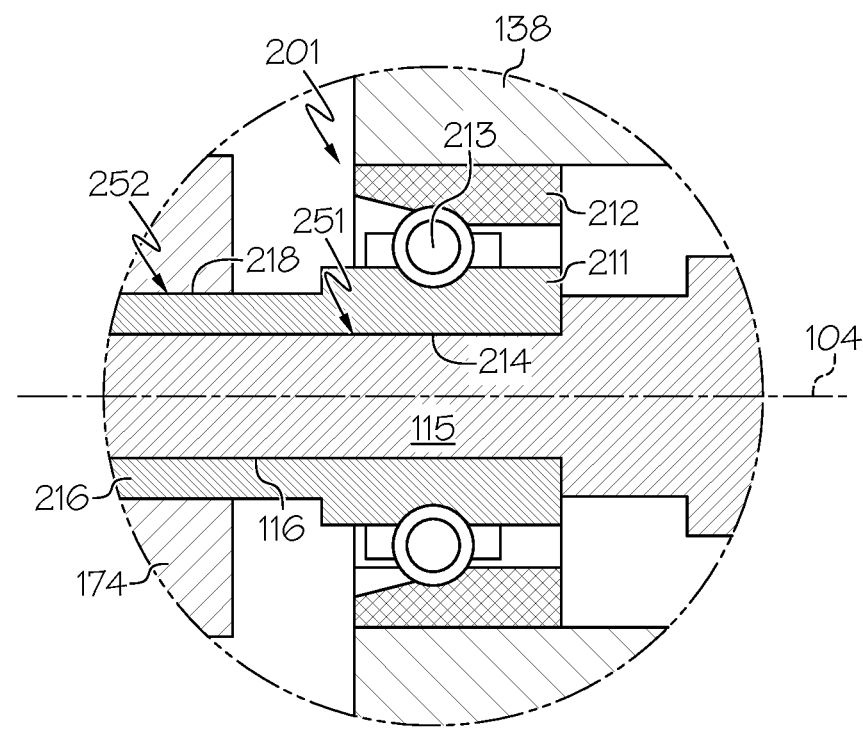
FIG. 3 is a detail cross-sectional view taken from FIG. 2.
Figure 4:
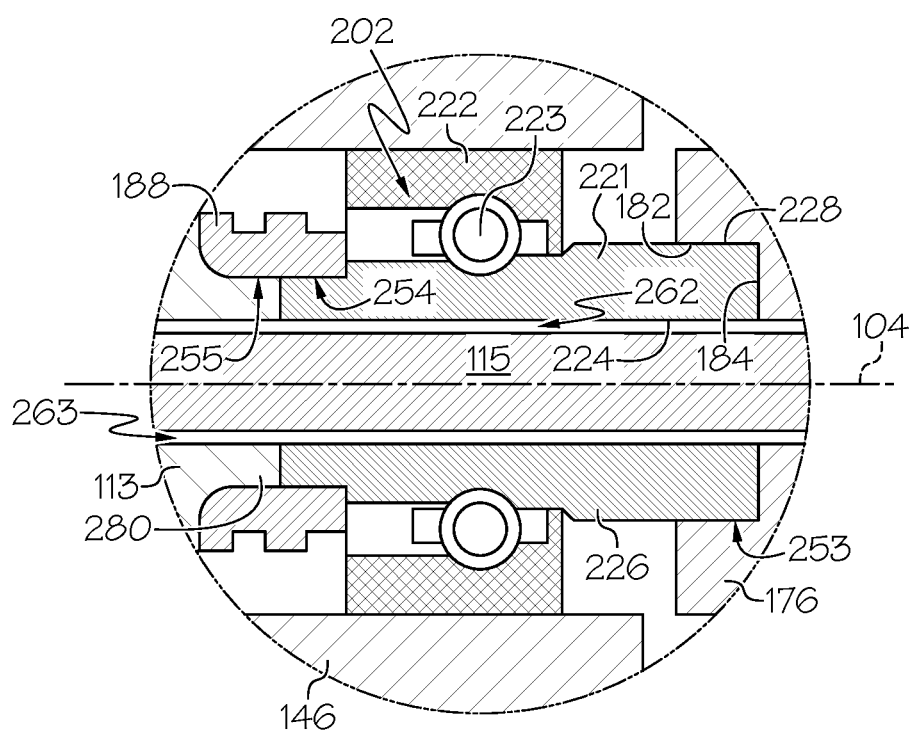
FIG. 4 is a detail cross-sectional view taken from FIG. 3.

The bearing system 105 will now be discussed in detail according to example embodiments. The bearing system 105 may include a first bearing 201 (FIG. 3) and a second bearing 202 (FIG. 4). The first bearing 201 and the second bearing 202 may be roller element bearings.

The first bearing 201 may include a first inner race 211, a first outer race 212, and a plurality of first roller elements 213. The first inner race 211 may be annular with a first inner radial surface 214 that may have a substantially constant diameter along a majority of its length. The first outer race 212 may be annular. The first roller elements 213 may be disposed radially between the first inner race 211 and the first outer race 212 and may be received within a groove or raceway defined in the first inner race 211 and the first outer race 212. The first inner race 211 may have an axial length that is greater than the first outer race 212. The first outer race 212 may be disposed to one end of the first inner race 211, and a projecting end 216 may project axially from the first outer race 212 and axially away from the turbine wheel 111. The projecting end 216 may define an outer radial surface 218.

The second bearing 202 may include a second inner race 221, a second outer race 222, and a plurality of second roller elements 223. The second inner race 221 may be annular with a second inner radial surface 224 that may have a substantially constant diameter along a majority of its length. The diameter of the second inner radial surface 224 may be slightly larger than that of the shaft 115. The second outer race 222 may be annular. The second roller elements 223 may be disposed radially between the second inner race 221 and the second outer race 222. The second outer race 222 may be disposed to one end of the second inner race 221, and a projecting end 226 may project axially from the second outer race 222 and axially away from the compressor wheel 113. The projecting end 226 may define an outer radial surface 228.

The assembly of the turbocharger 100 will now be discussed in reference to FIGS. 2-5. As will be discussed, the rotating group 102 may be assembled, for example, using a press 250 as represented in FIG. 5. Parts of the assembly may be attached with various mechanical fits. There may be different mechanical fits for different components on the shaft 115. In some embodiments, some parts may be affixed together with an interference fit between interfacing surfaces. Furthermore, in some embodiments, parts may be connected with a clearance fit between interfacing surfaces.

When assembled (FIGS. 2-5), the shaft 115 may extend through the intermediate housing 109. The turbine wheel 111 may be disposed on one side of the housing 109, and the compressor wheel 113 disposed on the opposite side. The turbine housing 106 (FIG. 1) may be fixed to the intermediate housing 109 and fit over the turbine wheel 111, and the compressor housing 107 may be fixed to the intermediate housing 109 and fit over the compressor wheel 107.

Furthermore, the shaft 115 may be received within the first inner race 211 of the first bearing 201 and within the second inner race 221 of the second bearing 202. As shown in FIG. 3, the first inner radial surface 214 may be interference fit (at a first interference fit 251) to the seat surface 116 the shaft 115. Accordingly, the first inner radial surface 214 may have a diameter that is slightly smaller than the seat surface 116, even when accounting for tolerancing. Thus, the first inner radial surface 214 may be fixedly attached via this interference fit 251 to the seat surface 116. It will be appreciated that the first bearing 201 may be formed and attached such that the first inner race 211 and the raceway for the first roller elements 213 are substantially coaxial and centered on the axis 104 with the shaft 115. It will be appreciated that the first inner radial surface 214 may be a control surface for centering and coaxially aligning other surfaces for maintaining high precision manufacture of the turbomachine 100.

Additionally, the first outer race 212 may be fixedly attached to the sleeve 138 of the intermediate housing 109. The first outer race 212 may be interference fit to the sleeve 138. Thus, the first bearing 201 may support the rotating group 102 for rotation about the axis 104 relative to the housing 109.

Furthermore, the projecting end 216 of the first inner race 211 may be received within the first spacer end 174 of the intermediate sleeve 164. The outer radial surface 218 may be interference fit (at a second interference fit 252) to the opposing surface of the first spacer end 174. Accordingly, the intermediate sleeve 164 may be centered and substantially coaxial with the first inner race 211 and, thus, centered and substantially coaxial with the shaft 115 due to the second interference fit 252.

The shaft 115 may also be received within the central bore opening 166 and may extend through the intermediate sleeve 164. The shaft 115 may be clearance fit within the central bore opening 166. Thus, the smallest diameter section of the intermediate sleeve 164 may be larger than the outer diameter of the shaft 115, even when accounting for tolerancing, so as to define a first clearance fit 261. In other words, there may be a radial gap between the outer surface of the shaft 115 and the inner surface of the intermediate sleeve 164.

Also, the second spacer end 176 of the intermediate sleeve 164 may receive the second inner race 221. The outer radial surface 218 of the second inner race 221 may be interference fit (at a third interference fit 253) to the opposing surface of the second spacer end 176 as shown in FIG. 4. Accordingly, the second inner race 221 may be centered and substantially coaxial with the intermediate sleeve 164, which is, in turn, centered and substantially coaxial with the first inner race 211, and which is, in turn, centered and substantially coaxial with the shaft 115.

The shaft 115 may also be received within the second inner race 221 and may extend therethrough. The shaft 115 may be clearance fit within the second inner race 221. Thus, the smallest diameter section of the second inner radial surface 224 may be larger than that of the outer diameter of the shaft 115, even when accounting for tolerancing, so as to define a second clearance fit 262 (FIG. 4). In other words, there may be a radial gap between the outer surface of the shaft 115 and the second inner radial surface 224.

Additionally, the second outer race 222 may be fixedly attached to the cap 146 of the intermediate housing 109. The second outer race 222 may be interference fit to the cap 146. Thus, the second bearing 202 may support the rotating group 102 for rotation about the axis 104 relative to the housing 109.

The second inner race 221 may be partly received within the spacer ring 188. In some embodiments, the spacer ring 188 may be interference fit to the second inner race 221 at a fourth interference fit 254 (FIG. 4). Also, a back hub 280 of the compressor wheel 113 may be interference fit and received in the other end of the spacer ring 188 at a fifth interference fit 255. The shaft 115 may extend through the compressor wheel 113 at a third clearance fit 263.

Additionally, the fastener 194 may be fastened to the second end 162 of the shaft 115. The fastener 194 may abut against the compressor wheel 113. As such, the fastener 194 may apply a compression load to the rotating group 102. The compressor wheel 113, and spacer ring 188, the inner race 221, etc. may be compressed together. Furthermore, the fastener 194 may support the rotating mass (the compressor wheel 113, the spacer ring 188, the inner race 221, etc. at the second end 162 of the shaft 115.

FIG. 5 also illustrates a method of manufacturing and assembling the turbocharger 100. In some embodiments, at least some of the parts may be press-fit together with at least one conventional press 250 using a conventional pressing process. The press 250 is shown schematically in FIG. 5 and it will be appreciated that a single press 250 may be modularly configured and re-configured for joining the parts of the rotating group 102 together. Alternatively, the press 250 may represent two or more presses that are used in sequence to assemble parts of the rotating group 102.

As such, in some embodiments, two or more parts of the rotating group 102 may be advanced together along the axis 104 within the press 250 to be joined. Specifically, the press 250 may be used to press-fit the first inner race 211 to the shaft 115 at the first interference fit 251. Subsequently, the press 250 may be used to press-fit the first inner race 211 to the intermediate sleeve 164 at the second interference fit 252. The second interference fit 252 may be formed while the shaft 115 extends through the intermediate sleeve 164 and while the intermediate sleeve 164 is disposed within the intermediate housing 109. Then, the second inner race 221 may be slip-fit to the shaft 115, and the press 250 may be used to press-fit the second inner race 221 to the intermediate sleeve 164. Afterward, the press 250 may be used to press-fit the spacer ring 188 on the second inner race 221 and the compressor wheel in the spacer ring 188. Finally, the fastener 194 may be fastened to the second end 162 of the shaft 115.

Thus, the bearing arrangement 105, the manufacturing methods, and other features of the present disclosure provide a number of advantages. These features increase manufacturing efficiency, increase precision, and thus, improve performance.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A turbomachine comprising:
   a housing;
   a rotating group including a shaft and an intermediate sleeve that receives the shaft;
   a bearing arrangement with a first bearing and a second bearing that include roller elements and that support the rotating group for rotation about an axis of rotation relative to the housing, the first bearing and the second bearing disposed on opposite axial ends of the intermediate sleeve;
   the first bearing having a first inner race with a first inner radial surface and a first outer radial surface, the first inner radial surface having a first interference fit with the shaft, the first outer radial surface having a second interference fit with the intermediate sleeve; and
   the second bearing having a second inner race with a second inner radial surface and a second outer radial surface, the second inner race receiving the shaft with a clearance fit, the second outer radial surface having a third interference fit with the intermediate sleeve, the second inner race being coaxially aligned with the first inner race and the shaft via coaxial alignment of the intermediate sleeve and the first inner race.

2. The turbomachine of claim 1, wherein the second inner race receives the shaft with a first clearance fit, and wherein the intermediate sleeve receives the shaft with a second clearance fit.

3. The turbomachine of claim 2, further comprising a wheel of the rotating group and a fastener that fastens to the shaft to compress the wheel along the axis toward the second inner race and to support the wheel on the shaft.

4. The turbomachine of claim 1, further comprising an e-machine that is operably coupled to the rotating group and configured to convert energy between rotation of the rotating group and electrical energy.

5. The turbomachine of claim 4, wherein the e-machine is an electric motor configured to convert electrical energy to driving rotate the rotating group.

6. The turbomachine of claim 5, wherein the rotating group includes a compressor wheel and a turbine wheel, and wherein the electric motor is disposed between the compressor wheel and the turbine wheel along the axis of rotation.

7. The turbomachine of claim 6, wherein the housing includes a motor case that encases a stator of the electric motor, a sleeve that receives the motor case, and a cap that attaches to the sleeve, the cap and the sleeve cooperatively housing the motor case;
   wherein the first bearing has a first outer race that is attached to the sleeve; and
   wherein the second bearing has a second outer race that is attached to the cap.

8. The turbomachine of claim 6, wherein the first bearing includes the first inner race and a first outer race, wherein the first inner race includes a projecting end that projects axially from the first outer race and axially away from the turbine wheel, the projecting end including the first outer radial surface.

9. The turbomachine of claim 6, wherein the second bearing includes the second inner race and a second outer race, wherein the second inner race includes a projecting end that projects axially from the second outer race and axially away from the compressor wheel, the projecting end including the second outer radial surface.

10. The turbomachine of claim 6, wherein the intermediate sleeve supports a rotor member of the electric motor, and wherein the intermediate sleeve includes a first spacer end and a second spacer end, the first spacer end and the second spacer end disposed on opposite axial ends of the rotor member, the first inner race fixed to the first spacer end at the second interference fit, and the second inner race fixed to the second spacer end at the third interference fit.

11. A method of manufacturing a turbomachine that includes a housing, a rotating group, and a roller element bearing arrangement that supports the rotating group for rotation about an axis of rotation relative to the housing, the method comprising:
   providing a first inner race of a first bearing and a second inner race of a second bearing of the bearing arrangement, the first inner race having a first inner radial surface and a first outer radial surface, the second inner race having a second inner radial surface and a second outer radial surface;
   attaching, with a first interference fit, a shaft of the rotating group to the first inner radial surface of the first inner race;
   attaching, with a second interference fit, the first outer radial surface to an intermediate sleeve of the rotating group;
   inserting the shaft into the second inner race with a clearance fit;
   attaching, with a third interference fit, the second outer radial surface to the intermediate sleeve to coaxially align the second inner race with the first inner race and the shaft via coaxial alignment of the intermediate sleeve and the first inner race.

12. The method of claim 11, wherein at least one of the attaching with the first interference fit, the attaching with the second interference fit, and the attaching with the third interference fit includes press fitting the at least one of the first interference fit, the second interference fit, and the third interference fit.

13. The method of claim 11, wherein the second inner race receives the shaft with a first clearance fit, and further comprising inserting the shaft through the intermediate sleeve with a second clearance fit.

14. The method of claim 13, further comprising inserting the shaft through a wheel of the rotating group; and
fastening a fastener on the shaft to compress the wheel along the axis toward the second inner race and to support the wheel on the shaft.

15. The method of claim 13, further comprising operably coupling an e-machine to the rotating group, the e-machine configured to convert energy between rotation of the rotating group and electrical energy.

16. The method of claim 15, further comprising providing a turbine wheel of the rotating group on one longitudinal side of the e-machine and providing a compressor wheel on an opposite longitudinal side of the e-machine.

17. The method of claim 16, wherein the e-machine is an electric motor;
further comprising encasing a stator member of the electric motor in a motor case;
further comprising providing the motor case within a sleeve of the housing;
further comprising attaching a cap of the housing to the sleeve to cooperatively house the motor case;
further comprising attaching a first outer race of the first bearing to the sleeve; and
further comprising attaching a second outer race of the second bearing to the cap.

18. The method of claim 16, wherein the e-machine is an electric motor; and
further comprising assembling the intermediate sleeve to include a rotor member of the electric motor, a first spacer, and a second spacer.

19. An e-assist turbocharger comprising:
a housing;
a rotating group including a shaft, a first wheel member fixed to the shaft, a second wheel member, and an intermediate sleeve that supports a rotor member of an electric motor, the intermediate sleeve disposed between the first wheel and the second wheel along an axial direction defined by an axis of rotation of the rotating group;
a bearing arrangement with a first bearing and a second bearing that include roller elements and that support the rotating group for rotation about the axis of rotation relative to the housing;
the first bearing disposed in the axial direction between the first wheel member and the intermediate sleeve, the first bearing having a first inner race with a first inner radial surface and a first outer radial surface, the first inner radial surface having a first radial interference fit with the shaft, the first outer radial surface having a second radial interference fit with the intermediate sleeve;
the second bearing disposed in the axial direction between the intermediate sleeve and the second wheel member, the second bearing having a second inner race that is fixed to the intermediate sleeve; and
a first radial clearance fit defined between the shaft and the intermediate sleeve, a second radial clearance fit defined between the shaft and the second inner race, and a third radial clearance fit defined between the shaft and the second wheel member.

20. The e-assist turbocharger assembly of claim 19, wherein the first wheel member is a turbine wheel member and the second wheel member is a compressor wheel member.

* * * * *